May 24, 1960 T. KENNEDY 2,937,665
PIPE COVERING
Filed Oct. 17, 1955
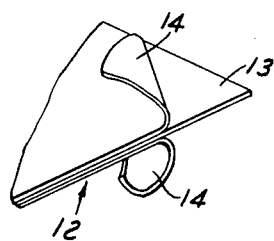
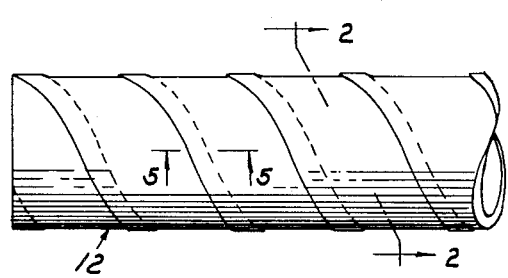
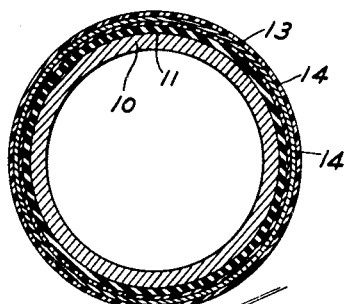
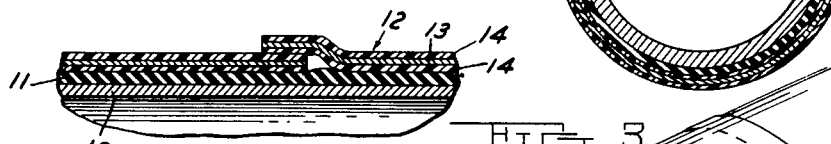
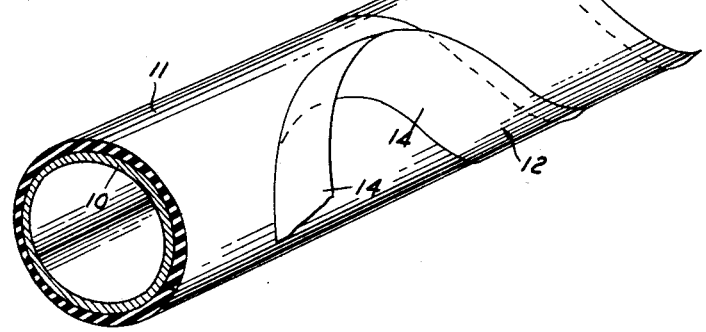
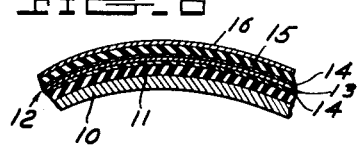
INVENTOR.
TED KENNEDY
BY
ATTORNEYS

United States Patent Office 2,937,665
Patented May 24, 1960

2,937,665

PIPE COVERING

Ted Kennedy, Ann Arbor, Mich., assignor to The Trenton Corporation, Ann Arbor, Mich., a corporation of Michigan Filed Oct. 17, 1955, Ser. No. 540,738

1 Claim. (Cl. 138—64)

This invention relates to corrosion-resistant coverings for pipes or conduits, and is a continuation-in-part of my co-pending application Serial No. 168,933, filed June 19, 1950, now abandoned.

It is well known that in instances where pipe, conduit, cables or other structures are installed underground, they are subject to attack by such corrosive elements as moisture, vapor, water, oil, gas, electric current, mold, bacteria and other elements that may be present in the soil. Due to the fact that installing pipe or conduit underground is a very expensive operation, and due to the fact that many necessary utility services depend on such installations, it is essential to reduce failures of the installations to a minimum. It is common practice in this art to protect the pipe from deterioration by covering the same with a corrosion-resistant compound, such for example, as inhibited wax having a rust preventive therein, asphalt and coal tar enamel types of coatings.

Coatings of the above general type unquestionably reduce failures caused by corrosion and are, therefore, beneficial. However, such coatings are usually relatively soft, and extreme care must be used in handling coated pipes or conduits to avoid puncturing or scraping the coating. This is especially true in instances where the coated conduit is exposed to sunlight or other sources of heat capable of softening the same.

With the above in view, it is an object of this invention to protect lengths of pipe or conduits with a shield comprising a sheet of corrosion-resistant material capable of being readily wound around a length of pipe in a manner such that the edges of adjacent convolutions of the sheet overlie or overlap one another. These overlying edges are intimately united together throughout their lengths to provide a sealed joint between the overlying edges of the shield.

One object of this invention is to provide a film-like coating of plastic or resinous material on opposite sides of the sheet. The resinous material is also corrosion-resistant and moisture and vapor-proof, and is of a nature to provide a continuous seal between the overlying edge portions of the sheet by the application of heat and pressure.

Still another object of the invention is to provide a corrosion-resistant moisture and vapor-proof sheet in the form of a metal foil having good electrical and heat conducting characteristics. The opposite sides of the metal foil may be coated with the resinous material described in the preceding paragraph, but the opposite edges of the metal foil are exposed so that any stray electrical currents may be readily grounded. Also, such a sheet renders it possible to conduct heat from the surface of the pipe or conduit to cooler areas for dissipation. As a result, the over all temperature of the conduit or pipe is lowered and this is advantageous in instances where the shield is applied over a corrosion-resistant heat softenable compound on the pipe, since it resists softening of the compound when exposed to sunlight or other sources of heat. Often times the composite shield comprising the resin coated metal foil is wrapped about the pipe immediately after the pipe has been covered with a heat softenable compound such as asphalt or coal tar referred to above, and the resinous coating on the shield may be damaged by the heat of the compound. The high heat conducting characteristics of the metal foil greatly reduces the likelihood of damage to the resinous coating since the heat is rapidly dissipated.

It is a further object of this invention to apply the shield over the usual heat softenable compound, and thereby not only protect the latter from injury during handling; but in addition, greatly increase the protection afforded the pipe or conduit by the coating.

The heat softenable compound usually provided on pipes or conduits is applied while in a softened condition, either during or prior to actual laying of the pipe and, if desired, the shield may be wrapped around the compound while the latter is at elevated temperatures. Also if desired, the plastic or resinous coatings on the barrier sheet of the shield may be of a nature to heat seal at approximately the softening temperature of the compound so that the overlying edges of the shield may be effectively heat sealed together at the same time the shield is wrapped around the compound. Under certain conditions some of the compound may squeeze out between the overlapping edges of the shield during the wrapping operation. This is not objectionable, since the compound serves as a seal and since the resin coating is heat sealed to the compound either by the temperature of the latter or by externally applied heat.

The foregoing as well as other objects will be made more apparent as this description proceeds, especially when considered in connection with the accompanying drawings wherein:

Figure 1 is a fragmentary elevational view of a length of pipe having a covering embodying the features of this invention;

Figure 2 is a cross sectional view taken on the line 2—2 of Figure 1;

Figure 3 is a fragmentary perspective view showing the manner in which the covering may be applied to the length of pipe;

Figure 4 is a fragmentary perspective view of a part of the pipe covering shown in Figure 1;

Figure 5 is an enlarged sectional view taken on the line 5—5 of Figure 1; and

Figure 6 is a fragmentary sectional view showing a slightly modified form of construction.

The present invention is shown herein for the purpose of illustration for protecting a length of pipe or conduit 10 formed of iron, steel, ferrous or non-ferrous metals, and having a relatively thick coating 11 of a pliable heat softening compound, such for example, as asphalt, coal tar enamel types of compounds or an inhibited wax compound containing a rust preventive. Compounds of the above general type are commonly used as a corrosion preventive and as a moisture vapor-proofing on pipes or conduits employed for underground installation, and are usually applied to the pipe when in a molten or semi-molten state. The selected compound or coating 11 may be applied to the pipe or conduit by well known equipment either prior to laying the pipe or at the same time the pipe is laid in the excavation.

In accordance with this invention the protection afforded the length of pipe 10 by the coating compound 11 is greatly supplemented by a shield 12 having exceptionally high corrosion-resistant characteristics, and being of a nature to enable readily wrapping the same around the length of pipe or conduit 10. The shield 12 is sufficiently flexible to readily conform to the contour of the outer surface of the compound or coating 11 regardless of irregularities that may appear in this surface, and as a result, air pockets between the shield 12 and the coating 11 on the length of pipe or conduit 10 are avoided. The arrangement is such that the shield 12 and coating 11 form a homogeneous covering around the pipe or conduit 10, which is highly effective in preventing corrosive elements in the soil from attacking the pipe or conduit.

The shield 12 comprises a very thin sheet 13 of material which may be aluminum foil, copper foil, magnesium foil, very light gauge sheet metal, or other materials possessing exceptionally high corrosion-resistant characteristics and which is moisture and vapor-proof. Such materials not only prevent the many different corrosive elements in the soil from eventually reaching the pipe or conduit 10, but in addition, enable the sheet 13 to act as a protection for the relatively soft compound or coating and prevent damage to the compound or coating 11 during handling of the pipe or conduit.

Although it is possible to form the sheet 13 of numerous different types of materials having corrosion resistant qualities, nevertheless, it is preferred to form the sheet of metal foil having good thermal and electrical conducting characteristics in addition to high corrosion resistant qualities. By selecting a material having good thermal conducting characteristics, heat is rapidly conducted from the pipe or conduit to cooler areas for dissipation. As a result the over all temperature of the pipe or conduit is reduced, and softening of the coating 11 by sunlight or other sources is minimized. This feature is especially advantageous in instances where the length of pipe or conduit 11 is coated prior to installation, since it resists softening of the compound or coating 11 during storage of the coated pipe or conduit, and thereby reduces damage to the coated pipe during handling.

The corrosion-resistant characteristics of the shield 12 are further enhanced by providing film-like coatings 14 of resinous or plastic materials on opposite sides of the sheet 13. Satisfactory results may be obtained by using thermoplastic resins, such for example, as polyethylene, polyvinyl, polyamide compounds or such materials sold under the trade names Koro-seal and Ply-o-film. In practice the plastic film-like coatings 14 may be applied to opposite sides of the sheet 13 in many different ways, such for example, as spraying, spreading (either with a roller or with a brush), or may be applied in sheet form by bonding the sheets directly to the opposite sides of the sheet 13 in accordance with accepted practice. Regardless of the method of application, the plastic or resinous material is referred to herein as a corrosion-resistant moisture and vapor-proof film-like coating, and this coating may vary in thickness depending upon the degree of protection required. In any case the shield 12 provides an impervious sheet around the compound or coating 11 of the length of pipe or conduit, and the nature of the shield is such as to prevent corrosive elements in the soil from reaching the compound or coating 11, so that any tendency for the compound or coating 11 to break down as a result of corrosive action is eliminated.

The shield 12 is preferably manufactured in relatively long strips, and is wrapped around the length of pipe or conduit 10 subsequent to applying the compound or coating 11 to the length of pipe 10. The shield 12 is wrapped in such a manner that the edges of adjacent convolutions overlie or overlap, and particularly satisfactory results may be obtained by winding the shield around the length of pipe in a spiral or helical fashion, as indicated in Figure 3 of the drawings. Also in practice it is preferred to wrap the shield 12 around the length of pipe 10 while the coating or compound 11 is at elevated temperatures. By following this procedure, the heat of the coating or compound 11 may be used to weld or intimately bond the inner plastic coating 14 on the shield to the coating compound 11. Also during this procedure, the overlapping edges of the shield are heat sealed together throughout their entire length, and a continuous moisture proof joint is provided between the overlapping edge portions of the shield. In instances where the compound or coating 11 is applied to the length of pipe in the field just prior to laying the pipe, suitable equipment such as a winding head, not shown herein, may be provided for wrapping the shield around the coating 11 immediately after the latter is applied to the length of pipe. It will, of course, be understood that the shield may also be applied at any time after the coating 11 is applied to the pipe or conduit by employing heat from sources other than the coating or compound 11.

In instances where the shield 12 is wrapped around the compound or coating 11 prior to final setting of this coating, it is possible that some of the coating 11 may squeeze outwardly between the overlapping edges of the shield. This condition is not objectionable, because the compound will actually serve as a seal, and in any case, the plastic coatings 14 seal themselves against the compound so that the escape of corrosive elements between the joints of the shield is definitely prevented.

In instances where the shield 12 is wrapped about the compound 11 immediately after the latter has been applied, or at least retains a substantial amount of residual heat, the tendency for the resinous coating 14 on opposite sides of the sheet 13 to be damaged by the heat of the compound is greatly reduced by the high heat conducting characteristics of the sheet 13 whereby such heat is rapidly conducted to cooler areas for dissipation.

It will also be noted particularly in Figure 5 of the drawing that the opposite longitudinal edges of the shield 12 are exposed. Moreover, since the material of the sheet 13 has excellent electrical conducting characteristics, stray electrical currents may be readily discharged into the soil without danger of reaching the pipe and causing corrosion of the pipe. According to basic corrosion principles, corrosion takes place whenever electric current leaves the metal surface of the pipe. Accordingly, it is highly desirable to return any stray electric currents to the soil as quickly as possible before they can reach any portion of the pipe which might accidentally be exposed. For example, should the shield pick up a stray electric current at one point along its length, that current should be grounded at once so that it cannot travel along the metal sheet of the shield until it may, by chance, come to an exposed portion of the pipe.

In order to preclude such an occurrence, the opposite edges of the shield are exposed so that the current will not travel for any great length along the shield but will be promptly grounded. The shield thus acts as a lightning rod which is grounded continuously along its length by the exposed edge of the overlying marginal portion of the shield as viewed in Figure 5.

In Figure 6 of the drawing, a modified construction is shown wherein a compound 15 similar to the compound 11 is applied to the outer surface of the shield, and the corrosion resistant qualities of the covering is thereby further enhanced. Also, if desired, a strip 16 of heavy paper, for example, may be wrapped around the layer of compound 15. This construction is especially desirable in cases where lengths of pipe are stored subsequent to the application of the protective covering. In such instances the heavy paper acts as a tell-tale to indicate any damage that may have come to the pipe during handling.

It is to be understood that the words "pipe" and "conduit" are used in their broader sense in both the above description and in the appended claims. For example, electrical underground lines and other underground structures may be protected by the covering forming the subject matter of this invention.

What I claim as my invention is:

The combination with a length of underground metal pipe, of a covering therefor comprising an elongated flexible strip having an elongated metal foil and a corrosion-resistant moisture and vapor proof dielectric resinous coating covering opposite sides of said foil, but not covering at least one longitudinal edge thereof, said strip being spirally wrapped around the length of pipe with adjacent convolutions partially overlying one another to provide said strip with a continuous overlying longitudinal edge corresponding to said one longitudinal edge of said foil, said metal foil having high electrical conducting characteristics, the continuous overlying longitudinal edge of said strip being uncovered and exposed throughout its entire length and the corresponding said one longitudinal edge of said metal foil being uncovered and exposed throughout its entire length so that said one longitudinal edge of said foil is grounded continuously throughout its entire length when the pipe with said covering applied as aforesaid is installed in the ground, whereby stray electrical currents at any point along the length of said foil are instantly grounded.

References Cited in the file of this patent

UNITED STATES PATENTS

| | | |
|---|---|---|
| 1,867,984 | Pistor | July 12, 1932 |
| 1,996,951 | Clark et al. | Apr. 9, 1935 |
| 2,291,838 | Shoan | Aug. 4, 1942 |
| 2,403,077 | Hershberger | July 2, 1946 |
| 2,551,591 | Foord | May 8, 1951 |
| 2,566,514 | Bischoff | Sept. 4, 1951 |
| 2,601,336 | Smith-Johannsen | June 24, 1952 |
| 2,713,383 | Kennedy | July 19, 1955 |
| 2,713,551 | Kennedy | July 19, 1955 |